(12) United States Patent
Shimizu

(10) Patent No.: US 9,116,277 B2
(45) Date of Patent: Aug. 25, 2015

(54) LIGHTING DEVICE, DISPLAY DEVICE, AND TELEVISION RECEIVER

(75) Inventor: Takaharu Shimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 101 days.

(21) Appl. No.: 13/980,648

(22) PCT Filed: Jan. 19, 2012

(86) PCT No.: PCT/JP2012/051071
§ 371 (c)(1),
(2), (4) Date: Jul. 19, 2013

(87) PCT Pub. No.: WO2012/102167
PCT Pub. Date: Aug. 2, 2012

(65) Prior Publication Data
US 2013/0293788 A1 Nov. 7, 2013

(30) Foreign Application Priority Data
Jan. 26, 2011 (JP) .................................. 2011-014364

(51) Int. Cl.
*G02B 6/00* (2006.01)
*F21V 8/00* (2006.01)
*H04N 5/64* (2006.01)
*G02F 1/1335* (2006.01)

(52) U.S. Cl.
CPC ............ *G02B 6/0091* (2013.01); *G02B 6/0031* (2013.01); *G02B 6/0055* (2013.01); *G02F 1/133615* (2013.01); *H04N 5/64* (2013.01); *G02B 6/0068* (2013.01); *G02B 6/0073* (2013.01); *G02B 6/0088* (2013.01); *G02F 2201/34* (2013.01); *G02F 2201/50* (2013.01)

(58) Field of Classification Search
CPC ............ G02F 1/133615; G02B 6/0023; G02B 6/0031
USPC ......... 362/612, 613, 621, 625, 622–624, 627, 362/632–634
See application file for complete search history.

(56) References Cited

U.S. PATENT DOCUMENTS

| | | | |
|---|---|---|---|
| 8,436,974 B2 * | 5/2013 | Yakura et al. | 349/150 |
| 2001/0053073 A1 * | 12/2001 | Itoh et al. | 362/31 |
| 2009/0086507 A1 * | 4/2009 | Iwasaki | 362/613 |
| 2010/0027296 A1 * | 2/2010 | Hamada | 362/632 |

(Continued)

FOREIGN PATENT DOCUMENTS

| | | |
|---|---|---|
| JP | 2002-279814 A | 9/2002 |
| JP | 2009-99438 A | 5/2009 |
| JP | 2009-158233 A | 7/2009 |

*Primary Examiner* — Julie Bannan
(74) *Attorney, Agent, or Firm* — Chen Yoshimura LLP

(57) ABSTRACT

The edge light type backlight device (12) includes a light guide plate (19); an LED light source (17); a reflective sheet (25), the edge thereof on the side facing the LED light source (17) extending toward the LED light source (17) beyond the surface of the light-guiding plate (19) that faces the LED light source (17); and a chassis (14) that has a bottom plate (14a) and side plates (14b) rise from one surface of the bottom plate (14a) and that stores therein the LED light source (17), the reflective sheet (25), and the light guide plate (19). The LED light source (17) is affixed to the side plate (14b) of the chassis (14). In the reflective sheet (25), near an edge of the reflective sheet (25) on a side facing the LED light source (17), a fold line (25a) for bending is disposed across two edges connected to that edge.

14 Claims, 10 Drawing Sheets

(56) References Cited

U.S. PATENT DOCUMENTS

| | | | |
|---|---|---|---|
| 2011/0116011 A1* | 5/2011 | Isobe et al. | 349/62 |
| 2011/0304792 A1* | 12/2011 | Lee et al. | 349/58 |
| 2012/0188790 A1* | 7/2012 | Isobe | 362/602 |
| 2013/0322121 A1* | 12/2013 | Yang | 362/612 |

* cited by examiner

LIGHTING DEVICE, DISPLAY DEVICE, AND TELEVISION RECEIVER

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. Liquid crystal panels used in liquid crystal display devices do not emit light on their own, and therefore, it is necessary to provide a separate backlight device as an illumination device.

An example of a conventional backlight device is an edge light-type backlight device in which a light-receiving surface is provided on a side face of a light guide plate, and a light source such as an LED is provided at the side face of the light guide plate. In such a backlight device, in order to enhance the utilization efficiency of light that entered the light guide plate, a reflective sheet is sometimes provided in a chassis, in addition to the light guide plate and the light source. The reflective sheet that reflects light is provided on a plate surface of the light guide plate on a side opposite to the light-emitting surface.

In the backlight device in which a reflective sheet that reflects light is provided on the plate surface of the light guide plate on the side opposite to the light-emitting surface in the chassis, if an edge of the reflective sheet on the side facing the light source is located further back from a surface of the light guide plate facing the light source, a bright line can appear on the display surface in a position overlapping the face of the light guide plate that faces the light source, possibly causing a display defect. In order to solve this problem, a technique is known in which the edge of the reflective sheet on the side facing the light source is extended toward the light source beyond the surface of the light guide plate facing the light source in the backlight device, thereby preventing the occurrence of the bright line. Patent Document 1 discloses such a backlight device, for example.

RELATED ART DOCUMENT

Patent Document

Patent Document 1: Japanese Patent Application Laid-Open Publication No. 2009-99438

PROBLEMS TO BE SOLVED BY THE INVENTION

In the backlight device disclosed in Patent Document 1 above, because the reflective sheet is extended toward the light source, when placing the reflective sheet into the chassis to which the light source is affixed, the edge of the reflective sheet on the side facing the light source can make contact with a light-emitting surface of the light source. In this case, the edge of the reflective sheet is caught by the light source, which possibly makes it difficult to assemble the device. Also, in this case, the edge of the reflective sheet contacts the light-emitting surface of the light source, possibly causing damage to the light-emitting surface of the light source.

SUMMARY OF THE INVENTION

The present invention was made taking into account the above-mentioned problems. An object of the present invention is to provide a technique, in an edge-light type illumination device, for preventing an edge of a reflective sheet from making contact with a light-emitting surface of a light source when placing the reflective sheet into a chassis to which the light source is affixed.

Means for Solving the Problems

The technique disclosed in the present specification relates to an illumination device that includes: a light guide plate having light-receiving surfaces disposed on side faces, a light-emitting surface disposed on one of plate surfaces, and an opposite surface that is on a side opposite to the light-emitting surface; light sources disposed to face the light-receiving surfaces of the light guide plate; a reflective sheet having a rectangular shape in a plan view and disposed on the opposite surface of the light guide plate, the reflective sheet having edges on respective sides facing the light sources be extended toward the light sources beyond respective faces of the light guide plate opposing the light sources; and a storage member having a bottom plate and side plates that rise from one surface of the bottom plate, the storage member storing at least the light sources, the reflective sheet, and the light guide plate, wherein the light sources are affixed to the side plates of the storage member, and wherein, in the reflective sheet, adjacent to at least one edge of the edges on the respective sides facing the light sources, a fold line for bending is disposed across two edges that are connected to the one edge.

In this illumination device, when placing the reflective sheet in the storage member to which the light sources are affixed in a manufacturing process of the illumination device, by bending an edge portion of the reflective sheet on the side facing the light sources along the fold line, it is possible to prevent the edge of the reflective sheet on the side facing the light sources from making contact with the light-emitting surfaces of the light sources.

The fold line may be provided such that a distance between the fold line and the edge of the reflective sheet on the side facing the light source is ⅓ or less of a distance between the edge and an opposite edge thereto.

If the distance between the fold line and the edge of the reflective sheet on the side facing the light source is ⅓ or more of the distance between the edge and an opposite edge thereto, the brightness on the display surface would become uneven between portions across the fold line, due to a change in positions of the reflective sheet and the light guide plate caused by vibrations and the like. With the above-mentioned configuration, it is possible to prevent or suppress the uneven brightness on the display surface caused by the change in positions of the reflective sheet and the light guide plate.

The fold line may be provided as a straight line along the edge of the reflective sheet on the side facing the light sources.

With this configuration, it is possible to make it easier to bend the reflective sheet along the fold line. Also, it is possible to make it easier to design the position of the fold line when providing the fold line to the reflective sheet.

It is also possible to provide perforations along the fold line. Alternatively, a cut formed by cutting the reflective sheet to a half depth of a thickness direction thereof may be disposed along the fold line.

With these configurations, it is possible to make it easier to bend the reflective sheet along the fold line.

The reflective sheet may be installed in the storage member so as to be bent along the fold line toward the bottom plate of the storage member.

With this configuration, when placing the reflective sheet bent along the fold line into the storage member, it is possible to prevent the edge of the reflective sheet from making contact with the light sources more effectively than the case in which the reflective sheet is bent in the opposite way.

The edge of the reflective sheet on the side facing the light sources may be in contact with a bottom of the light sources.

With this configuration, because the edge of the reflective sheet that is placed in the storage member is in contact with the bottom of the light sources, the edge of the reflective sheet can be prevented from being raised, which can prevent the reflective sheet from moving from the proper position, and the like.

The reflective sheet may be disposed so as to make contact with the opposite surface of the light guide plate, and the fold line may be provided in a position to be covered by the light guide plate.

With this configuration, the fold line of the reflective sheet placed in the storage member is in contact with the light guide plate, and therefore, it is possible to prevent the reflective sheet from being bent again along the fold line after being installed in the storage member.

An edge portion of the bottom plate of the storage member on a side where the light sources are disposed may be inclined toward a side opposite to the light-emitting surface of the light guide plate.

With this configuration, when placing the edge of the reflective sheet under the light sources in the storage member, the edge of the bent part of the reflective sheet is placed along the inclined portion, and therefore, it is possible to make it easier for the reflective sheet to be installed.

The illumination device may further include a light source substrate having a plurality of light sources mentioned above, and the light source substrate may be affixed to each of the side plates of the storage member.

With this configuration, because it is not necessary to provide a fixing member for the light source substrates, it is possible to make the frame of the storage member narrower, which allows the display surface of the display device to be made larger.

The techniques disclosed in the present specification may be a display device that includes a display panel that displays images using light from the above-mentioned illumination device. A display device that uses, as the display panel, a liquid crystal panel using liquid crystal is novel and useful.

In the display device that is disposed such that a direction perpendicular to the thickness direction of the light guide plate is an up and down direction, the light sources may be disposed on an upper side and a lower side of the light guide plate, respectively, and the fold lines may be respectively provided near an edge of the reflective sheet on a side facing the light sources provided on the upper side of the light guide plate and near an edge of the reflective sheet on a side facing the light sources provided on the lower side of the light guide plate.

With this configuration, by providing the fold lines on both edges of the reflective sheet along the upper side and the lower side of the light guide plate, it is possible to make it even easier to install the reflective sheet by placing the edges of the respective sheet under the light sources in the storage member.

The television receiver equipped with the above-mentioned display device is also novel and useful. With the above-mentioned display device and television, it is possible to attain a greater area for the display region.

Effects of the Invention

With the technique disclosed in the present specification, it is possible to prevent the light-emitting surfaces of the light sources from being damaged when the reflective sheet is installed in the chasses to which the light sources are affixed.

DETAILED DESCRIPTION OF EMBODIMENTS

<Embodiment 1>

Embodiment 1 will be described with reference to the drawings. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

Figure 1:
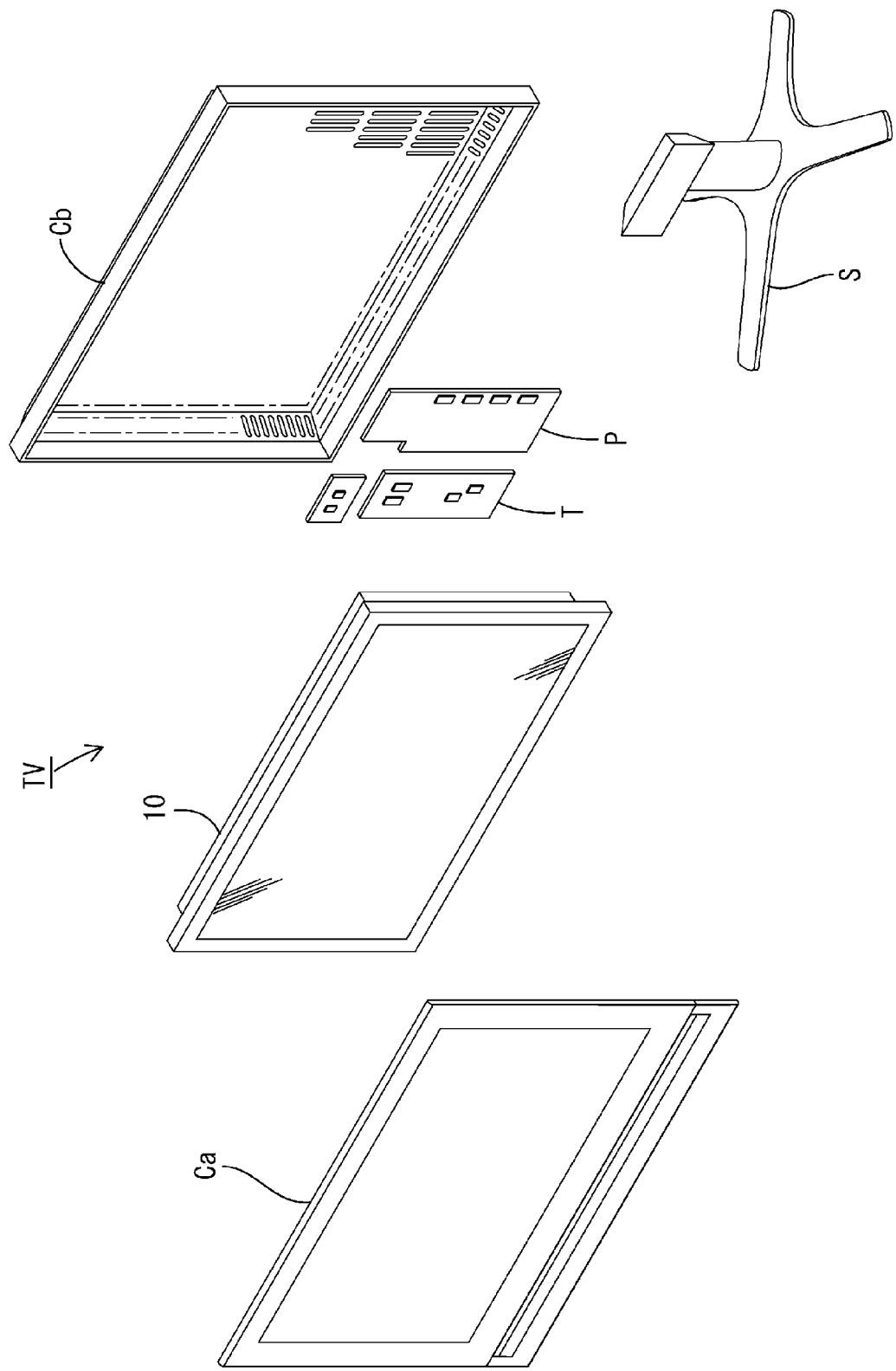
FIG. 1 is an exploded perspective view of a television receiver TV according to Embodiment 1.

FIG. 1 is an exploded perspective view of a television receiver TV according to Embodiment 1. The television receiver TV includes a liquid crystal display device 10, front and rear cabinets Ca and Cb that store the display device D therebetween, a power source P, a tuner T, and a stand S.

Figure 2:
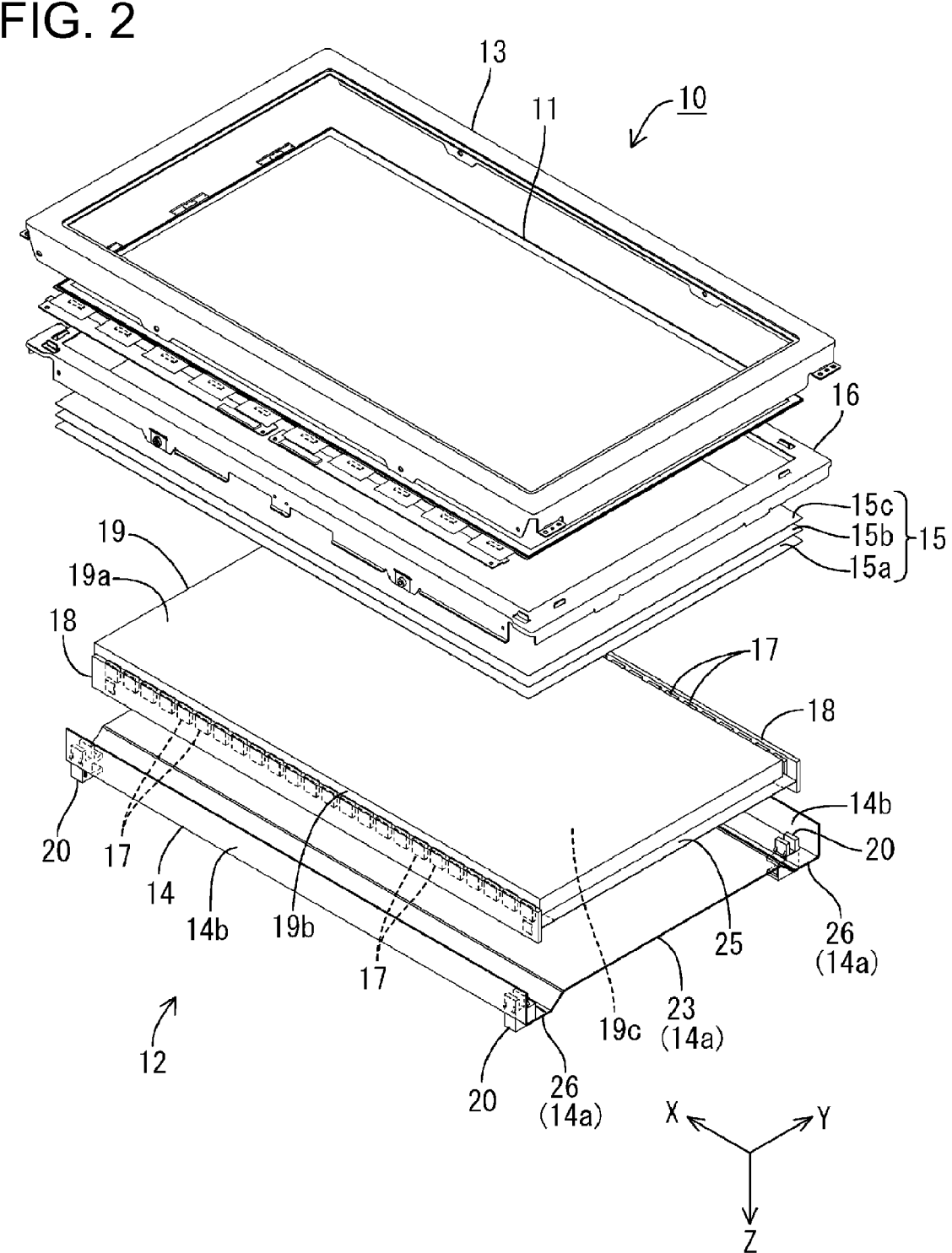
FIG. 2 is an exploded perspective view of a liquid crystal display device 10.
Figure 3:
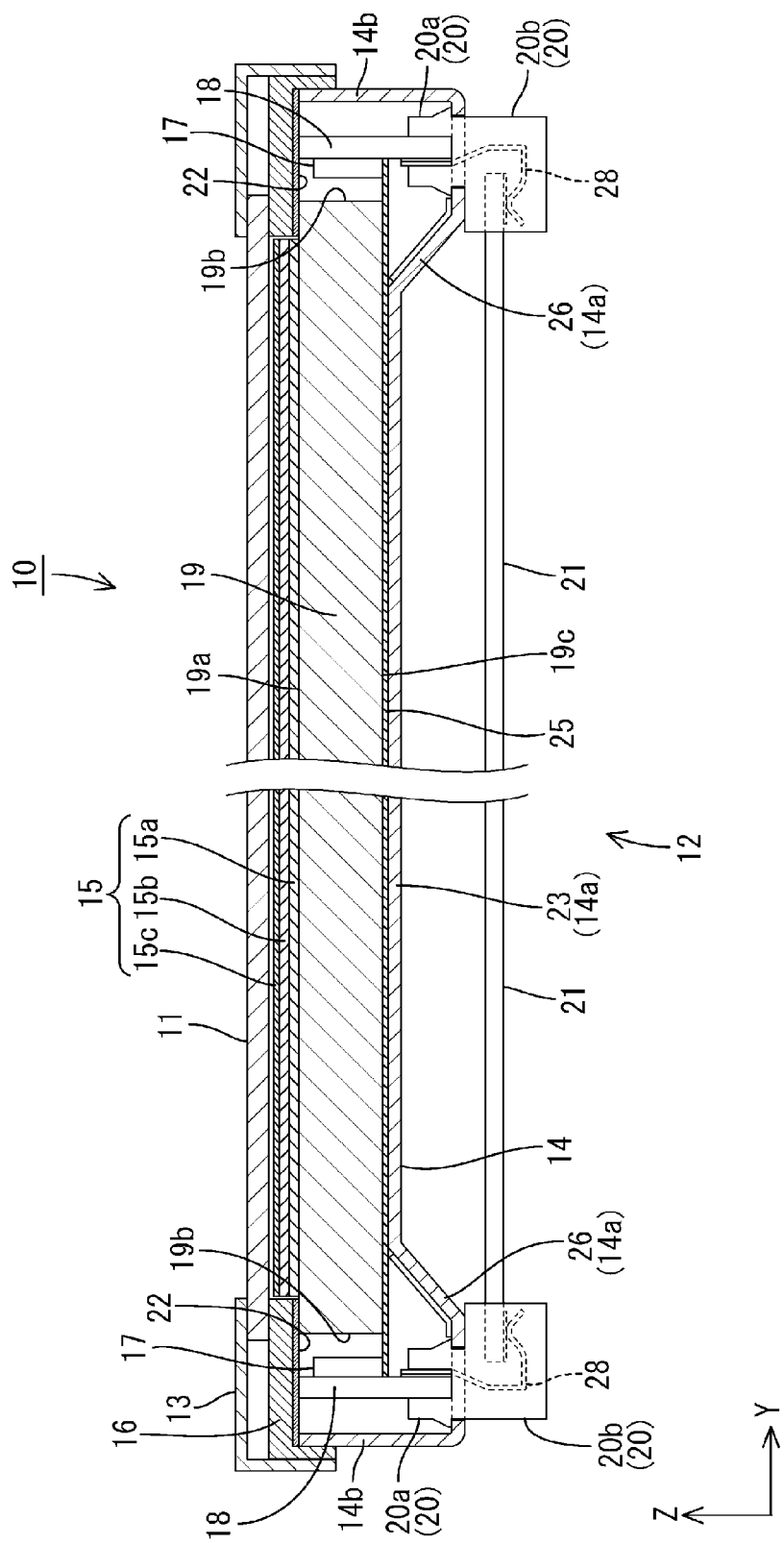
FIG. 3 is a cross-sectional view of the liquid crystal display device 10 along the vertical direction.

FIG. 2 is an exploded perspective view of the liquid crystal display device 10. FIG. 3 is a cross-sectional view that shows a cross-section of the liquid crystal display device 10 along the vertical direction (Y axis direction). The top side of FIGS. 2 and 3 is the front side, and the bottom side of FIGS. 2 and 3 is the rear side. As shown in FIG. 2, the liquid crystal display device 10 is a horizontally long rectangle as a whole, includes a liquid crystal panel 11, which is a display panel, and a backlight device 12, which is an external light source, and is held together integrally with a frame-shaped bezel 13 and the like.

In the liquid crystal panel 11, a pair of transparent (having a high light transmission) glass substrates is bonded together with a prescribed gap therebetween, and a liquid crystal layer (not shown) is sealed between the glass substrates. One of the two glass substrates is provided with switching elements (TFTs, for example) connected to source wiring lines and gate wiring lines that intersect each other, pixel electrodes connected to the switching elements, an alignment film, and the like. The other glass substrate is provided with color filters made of colored portions of R (red), G (green), B (blue), and the like arranged in a prescribed pattern, an opposite electrode, an alignment film, and the like. Of these, the source wiring lines, the gate wiring lines, the opposite electrode, and the like are supplied with image data and various control signals necessary for image display from a not-shown driver circuit substrate. Polarizing plates (not shown) are disposed on the outside of the two glass substrates, respectively.

As shown in FIG. 2, the backlight device 12 includes a chassis 14 of a substantially box shape having an opened section on the light-emitting side (side facing the liquid crystal panel 11), optical members 15 disposed to cover the opened section of the chassis 14, and a frame 16 in a frame shape that supports the liquid crystal panel 11 along the inner edges thereof. The chassis 14 stores therein LEDs (light-emitting diodes) 17 that are light sources, LED substrates 18 on which the LEDs 17 are mounted, and a light guide plate 19 that guides light from the LEDs 17 toward the optical members 15. In the backlight device 12 of the present embodiment, the light guide plate 19 and the optical members 15 are disposed directly below the liquid crystal panel 11, and the LEDs 17, which are the light sources, are disposed on side edges of the light guide plate 19, this configuration being the so-called edge light type (side light type). The backlight device 12 further includes a power supply substrate 21 that is disposed outside of the chassis 14 and that supplies driving power to the LEDs 17, and connectors 20 that are attached to the chassis 14 and that support the power supply substrate 21.

Next, each constituting component of the backlight device 12 will be explained. The chassis 14 is made of a metal such as an aluminum material, for example, and as shown in FIGS. 2 and 3, includes a bottom plate 14a that is a rectangle in a plan view, and a pair of side plates 14b and 14b that rise from the respective outer edges along the long sides of the bottom plate 14a. A space between the LED substrates 18 in the chassis 14 is a storage space for the light guide plate 19. Edge portions of the bottom plate 14a of the chassis 14 along the sides at which the LEDs 17 are provided are bent toward a side opposite to the light-emitting surface 19a of the light guide plate 19. In the chassis 14, the long side direction thereof matches the X axis direction (horizontal direction), and the short side direction thereof matches the Y axis direction (vertical direction).

The optical members 15 include a diffusion sheet 15a, a lens sheet 15b, and a reflective polarizing plate 15c layered in this order from the light guide plate 19. The diffusion sheet 15a, the lens sheet 15b, and the reflective polarizing plate 15c have the function of converting the light emitted from the LEDs 17 and transmitted through the light guide plate 19 into planar light. The liquid crystal panel 11 is disposed on the upper side of the reflective polarizing plate 15c, which means that the optical members 15 are disposed between the light guide plate 19 and the liquid crystal panel 11.

The LED substrates 18 are made of a synthetic resin or ceramic, and are each formed in a narrow rectangle. The bottom thereof at each end of the lengthwise direction is supported by a connector 20. The LEDs 17 emit white light, and are arranged in a row on each LED substrate 18 such that the light-emitting surfaces thereof face each light-receiving surface 19b of the light guide plate 19. The LED 17 may have a configuration in which white light is emitted by having a blue light emitting element coated with a fluorescent material that has a light emitting peak in the yellow region. The LED 17 may alternatively have a configuration in which white light is emitted by having a blue light emitting element coated with fluorescent materials that have light emitting peaks in the green region and the red region, respectively. The LED 17 may also have a configuration in which white light is emitted by having a blue light emitting element coated with a fluorescent material that has a light emitting peak in the green region, and combining this with a red light emitting element. The LED 17 may also have a configuration in which white light is emitted by combining a blue light emitting element, a green light emitting element, and a red light emitting element. The LED 17 may also be a combination of an ultraviolet light emitting element with fluorescent materials. In particular, the LED 17 may have a configuration in which white light is emitted by having the ultraviolet light emitting element coated with fluorescent materials that have light emitting peaks in the blue, green, and red regions, respectively.

The light guide plate 19 is a rectangular plate-shaped member formed of a resin of acrylic or the like having a high light transmission (high transparency). The light guide plate 19 is in contact with the reflective sheet 25 and supported by the chassis 14. The light guide plate 19 is positioned such that the side faces 19b along the lengthwise direction (light-receiving surfaces) face the LED substrates 18, and the frame 16 holds the front side of the light guide plate 19. As shown in FIG. 2, the light guide plate 19 is disposed between the pair of LED substrates 18 and 18 such that the light-emitting surface 19a, which is the main plate surface, faces the diffusion sheet 15a and such that the opposite surface 19c on a side opposite to the light-emitting surface 19a faces the reflective sheet 25. By disposing the light guide plate 19 in this way, light that was emitted from the LEDs 17 enters the light guide plate 19 through the light-receiving surfaces 19b, and exits through the light-emitting surface 19a that faces the diffusion sheet 15a, thereby illuminating the liquid crystal panel 11 from the rear side.

As shown in FIG. 2, a pair of connectors 20 is disposed near respective ends of each long side of the chassis 14. As shown in FIG. 3, the connector 20 is attached to the bottom plate 14a of the chassis 14, and is held penetrating the bottom plate 14a. Of the connector 20, a portion protruding to the inside of the chassis 14 is an LED substrate supporting part 20a that can support the LED substrate 18, and a portion protruding to the outside of the chassis 14 is a power supply substrate supporting portion 20b that can support the power supply substrate 21 that is provided outside of the chassis 14. The respective end portions of the bottom plate 14a along the short side direction, except for a portion 23 that supports the light guide plate, are connector attachment portions to which the connectors 20 are attached. In the power supply substrate supporting portion 20b, a connecting terminal 28 made of a metal is embedded. One end of the connecting terminal 28 is in contact with a terminal of the LED substrate 18, and the other end is in contact with a terminal of the power supply substrate 21. The terminal of the LED substrate 18 and the terminal of the power supply substrate 21 are electrically connected to each other through the connecting terminal 28 made of a metal.

Figure 4:
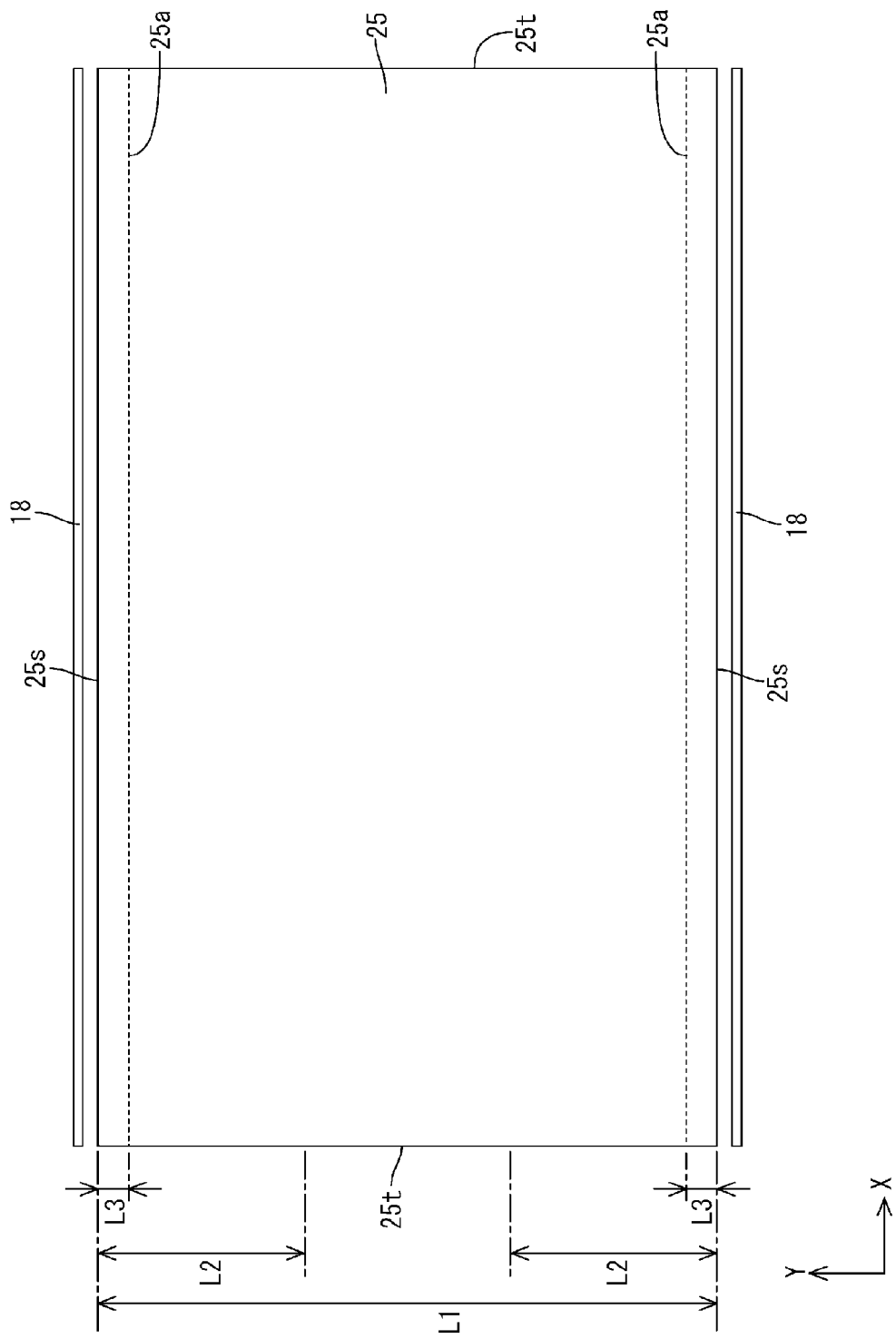
FIG. 4 is a front side plan view of a reflective sheet 25 and LED substrates 18.

Next, the configuration of the reflective sheet 25 will be explained in detail. FIG. 4 is a front side plan view of the reflective sheet 25 and the LED substrates 18. The reflective sheet 25 is made of a synthetic resin to a rectangular shape, and the front surface thereof is colored white that has a high light reflectivity. The reflective sheet 25 has a reflective surface on the front side, and the reflective surface is in contact with the opposite surface 19c of the light guide plate 19. Edges 25s of the reflective sheet 25 that respectively face the LEDs 17 (edges along the long side direction; see FIG. 4) are positioned closer to the LEDs 17 than the respective side faces (light-receiving surfaces 19b) of the light guide plate 19 that face the LEDs 17 (see FIG. 3). This way, the reflective sheet 25 can reflect light that leaked from the LEDs 17 or the light guide plate 19 toward the opposite surface 19c. Each edge of the reflective sheet 25 that is extended toward the LEDs 17 is in contact with a side plate 14b of the chassis 14 and in contact with the bottom of the LEDs 17.

As shown in FIG. 4, near each of the edges 25s and 25s of the reflective sheet 25 that faces the LEDs 17, a fold line 25a for bending is provided across the two short side edges 25t and 25t. Specifically, these fold lines 25a and 25a have perforations, and are provided as a straight line that is parallel to each long side edge 25s of the reflective sheet 25. Therefore, when the liquid crystal panel 11 stands upright (see FIG. 1), the fold lines 25a and 25a are respectively provided near the edge 25s of the reflective sheet 25 on the side facing the LEDs 17 of the upper side of the light guide plate 19 and near the edge 25s of the reflective sheet 25 on the side facing the LEDs 17 of the lower side of the light guide plate 19. The fold lines 25a and 25a are in contact with the bottom plate 14a of the chassis 14, and are covered by the light guide plate 19.

L1 in FIG. 4 represents the length of the reflective sheet 25 along the short side; L2 represents a length that is ⅓ of the length L1; and L3 represents a distance between a fold line 25a and an edge of the reflective sheet 25 on a side facing the LEDs 17 (long side edge). In the reflective sheet 25 of the present embodiment, a relation of L2>L3 is fulfilled. That is, each of the fold lines 25a and 25a is provided such that the distance between each fold line 25a and an edge 25s of the reflective sheet 25 on the side where the fold line 25a is provided, which is the side facing the LEDs 17, is ⅓ or smaller of the distance between the edge 25s and the other edge 25s opposite thereto. When the above-mentioned relation is fulfilled in the reflective sheet 25, even if there is a change in relative positions of the reflective sheet 25 and the light guide plate 19 after the reflective sheet 25 is stored in the chassis 14, it is possible to prevent uneven brightness from being caused on the display surface of the liquid crystal panel 11 as a result of the fold lines 25a of the reflective sheet 25.

Figure 5:
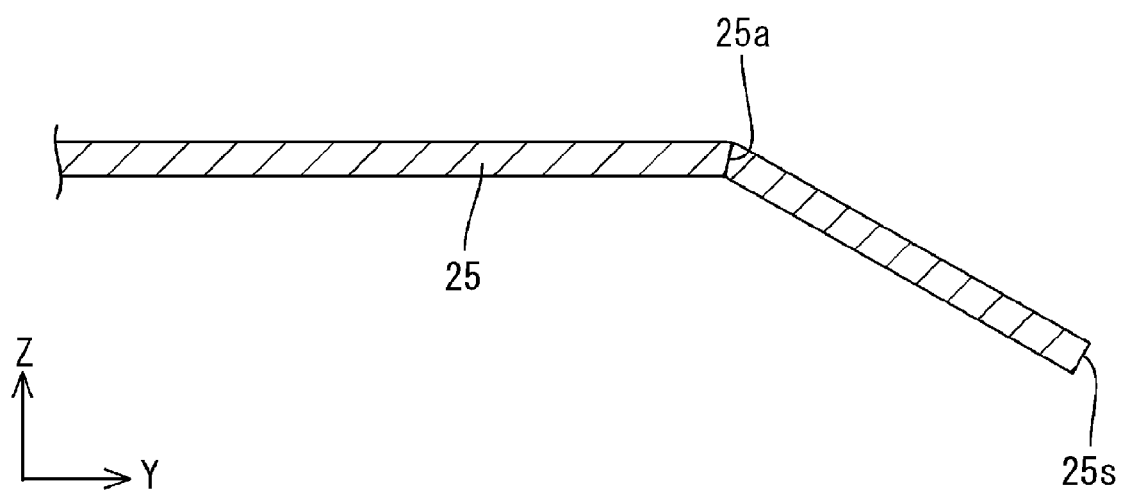
FIG. 5 shows a process (1) of a method to install the reflective sheet 25 in a chassis 14.
Figure 6:
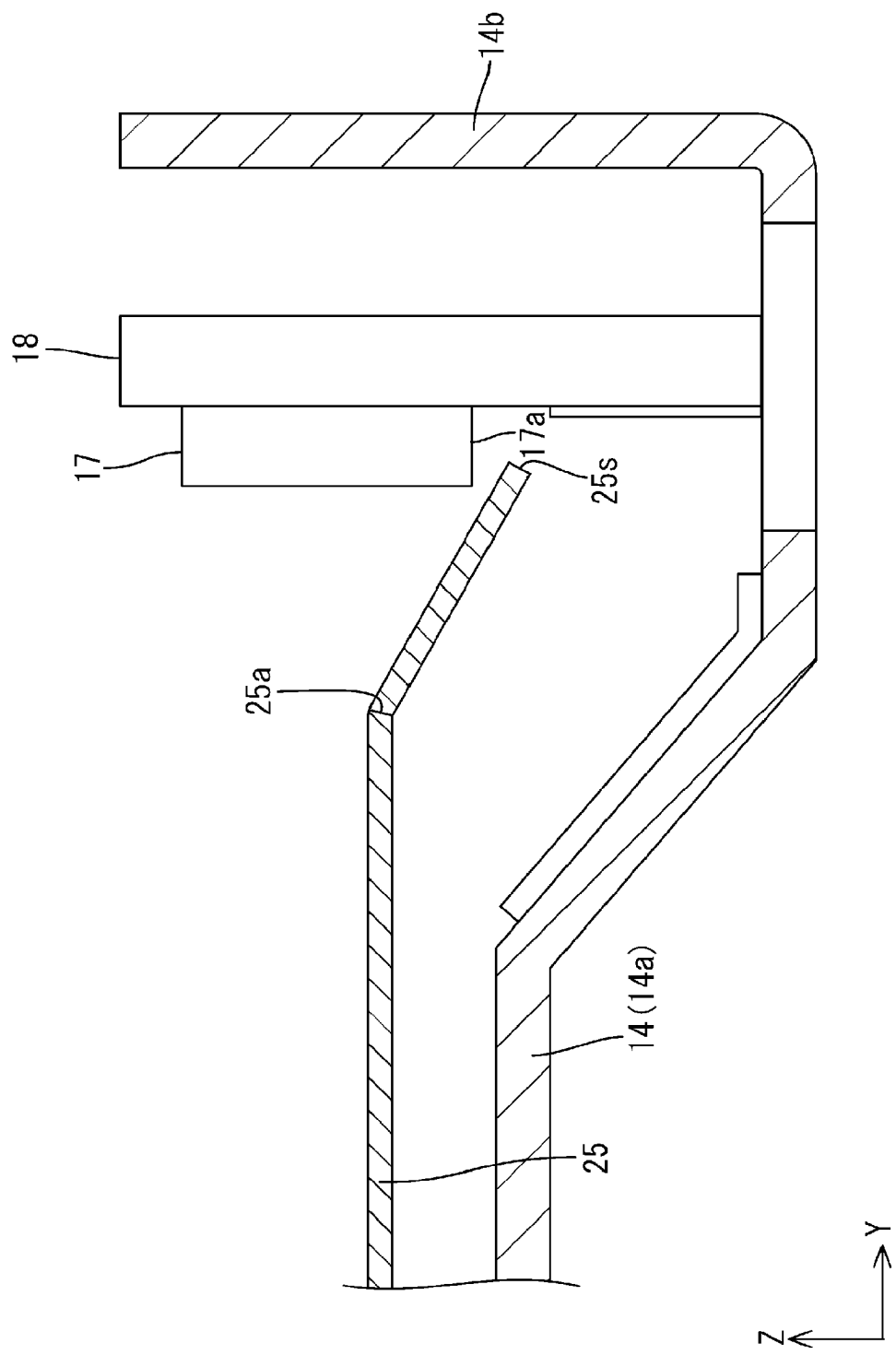
FIG. 6 shows a process (2) of the method to install the reflective sheet 25 in the chassis 14.
Figure 7:
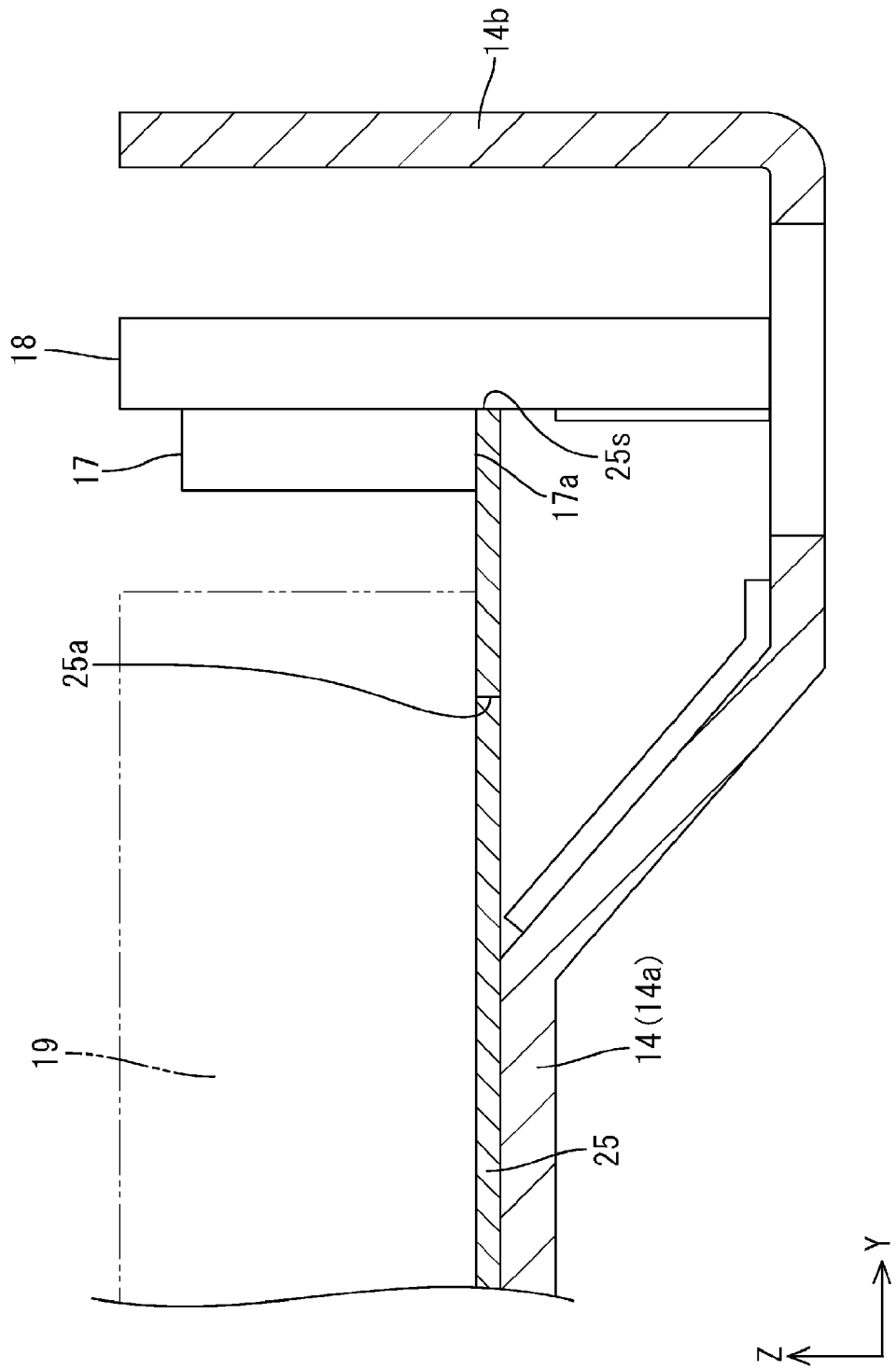
FIG. 7 shows a process (3) of the method to install the reflective sheet 25 in the chassis 14.

Next, in the manufacturing process of the backlight device 12, a method to install the reflective sheet 25 in the chassis 14 to which the LEDs 17 are affixed will be explained. FIG. 5 is a cross-sectional view near an edge 25s of the reflective sheet 25 with a fold line 25a provided nearby, and shows a process (1) in the method to install the reflective sheet 25 in the chassis 14. FIG. 6 is a cross-sectional view that corresponds to the cross section of FIG. 5, and shows a process (2) in the method to install the reflective sheet 25 in the chassis 14. FIG. 7 is a cross-sectional view that corresponds to the cross section of FIG. 5, and shows a process (3) in the method to install the reflective sheet 25 in the chassis 14.

First, as shown in FIG. 5, a portion near the edge 25s of the reflective sheet 25 on the side facing the LEDs 17 is bent along the fold line 25a. The reflective sheet 25 is disposed so as to be bent toward the bottom plate 14a of the chassis (lower side of FIG. 5) along the fold line 25a. This way, the reflective sheet 25 is bent downward along the fold line 25a in a cross-sectional view.

Next, as shown in FIG. 6, with the reflective sheet 25 being bent along the fold line 25a, the edge 25s of the reflective sheet 25 is placed along the inclined portion at an edge of the chassis 14 such that the edge 25s of the reflective sheet 25 on the side facing the LEDs 17 is positioned under the bottom 17a of each LED 17. The LED substrate 18 on which the LEDs 17 are mounted has been affixed to the chassis 14 through the connectors 20 (see FIG. 3) in advance.

Next, the position of the reflective sheet 25 is set while bending back the portion near the edge 25s of the reflective sheet 25 on the side facing the LEDs 17 toward the LED substrate 18, and the reflective sheet 25 is disposed on the bottom plate 14a of the chassis 14. As a result, as shown in FIG. 7, the reflective sheet 25 is disposed on the bottom plate 14a of the chassis 14 with the edge 25s on the side facing the LEDs 17 being in contact with the LED substrate 18 and the bottom 17a of each LED 17. With this method, the reflective sheet 25 can be stored in the chassis 14 without causing the edge 25s of the reflective sheet 25, which is closer to the LEDs 17 than the side face 19b of the light guide plate 19 that faces the LEDs 17, to make contact with the light-emitting surfaces of the LEDs 17.

As described above, in the backlight device 12 of the present embodiment, when placing the reflective sheet 25 in the chassis 14, to which the LEDs 17 are affixed, during the manufacturing process of the backlight device 12, by bending the portion near the edge 25s of the reflective sheet 25 on the side facing the LEDs 17 along the fold line 25a, it is possible to prevent the edge of the reflective sheet 25 on the side facing the LEDs 17 from making contact with the light-emitting surfaces of the LEDs.

In the backlight device 12 of the present embodiment, the fold line 25a is provided such that the distance L3 between the fold line 25a and an edge 25s of the reflective sheet 25 on the side facing the LEDs 17 is ⅓ (L2) or less of the distance L1 between the edge 25s and the other edge 25s opposite thereto. This makes it possible to prevent or suppress the uneven brightness on the display surface of the liquid crystal panel 11, which is caused by a change in positions of the reflective sheet 25 and the light guide plate 19.

In the backlight device 12 of the present embodiment, the fold line 25a is provided as a straight line along the edge 25s of the reflective sheet 25 on the side facing the LEDs 17. This makes it easier to bend the reflective sheet 25 along the fold line 25a. This also makes it easier to design the position of the fold line 25a when providing the fold line 25a in the reflective sheet 25.

In the backlight device 12 of the present embodiment, perforations are provided along the fold line 25a. This makes it easier to bend the reflective sheet 25 along the fold line 25a.

In the backlight device 12 of the present embodiment, the reflective sheet 25 is placed in the chassis 14 so as to be bent toward the bottom plate 14a of the chassis 14 along the fold line 25a. With this configuration, when placing the reflective sheet 25 that is bent along the fold line 25a in the chassis 14, it is possible to prevent the edge of the reflective sheet 25 from making contact with the LEDs 17 more effectively than the case in which the reflective sheet 25 is bent in the opposite way.

In the backlight device 12 of the present embodiment, the edge 25s of the reflective sheet 25 on the side facing the LEDs 17 is in contact with the bottom of the LEDs 17. With this configuration, because the edge 25s of the reflective sheet 25 that is stored in the chassis 14 is in contact with the bottom of the LEDs 17, the edge 25s can be prevented from being raised, which can prevent the reflective sheet 25 from moving from the proper position, and the like due to vibrations and the like.

In the backlight device 12 of the present embodiment, the reflective sheet 25 is in contact with the opposite surface 19c of the light guide plate 19, and the fold line 25a is provided in a position that is covered by the light guide plate 19. With this configuration, the fold line 25a of the reflective sheet 25 stored in the chassis 14 is in contact with the light guide plate 19, and therefore, it is possible to prevent the reflective sheet 25 from being bent again along the fold line 25a after being installed in the chassis 14.

In the backlight device 12 of the present embodiment, an edge portion of the bottom plate 14a of the chassis 14 on the side where the LEDs 17 are disposed is inclined toward a side opposite to the light-emitting surface 19a of the light guide plate 19. With this configuration, when placing the edge of the reflective sheet 25 under the LEDs in the chassis 14, the bent part of the reflective sheet 25 is placed along the inclined portion, and therefore, it is possible to make it easier for the reflective sheet 25 to be installed.

The liquid crystal display device 10 of the present embodiment is the liquid crystal display device 10 that is disposed such that a direction perpendicular to the thickness direction of the light guide plate 19 is the up and down direction (vertical direction, Y axis direction). The LEDs 17 are respectively disposed on the upper side and the lower side of the light guide plate 19, and the fold lines 25a are respectively provided near an edge 25s of the reflective sheet 25 on a side facing the LEDs 17 of the upper side of the light guide plate 19 and near an edge 25s of the reflective sheet 25 on a side facing the LEDs 17 of the lower side of the light guide plate 19. With this configuration, it is possible to make it even easier to place the reflective sheet 25 when installing the edges of the respective sheet 25 under the LEDs 17 (bottom 17a) in the chassis 14.

<Embodiment 2>

Figure 8:
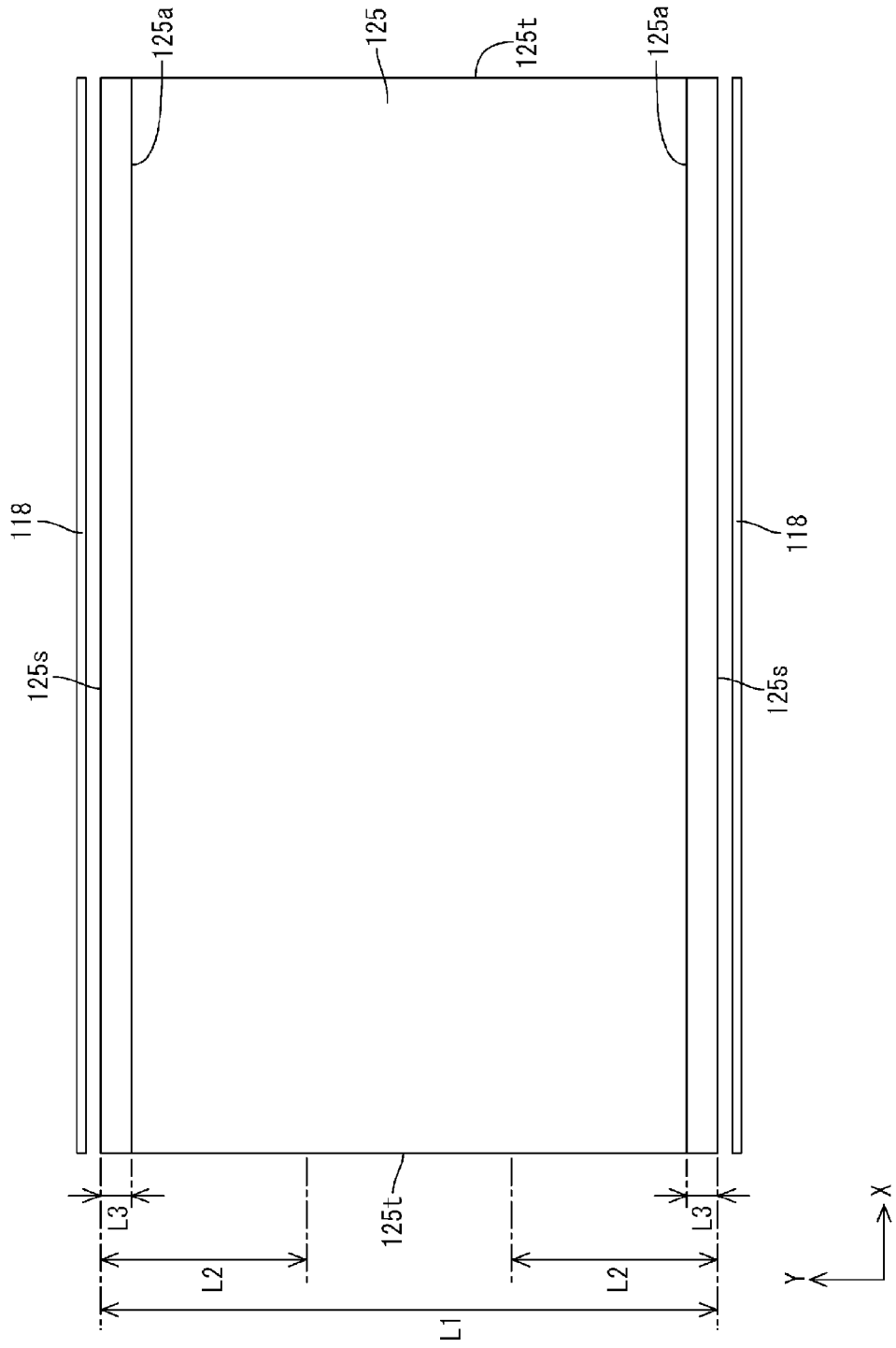
FIG. 8 is a front side plan view of a reflective sheet 125 and LED substrates 118 of Embodiment 2.

Embodiment 2 will be described with reference to the drawings. FIG. 8 is a front side plan view of a reflective sheet 125 and LED substrates 118 of Embodiment 2. Parts in FIG. 8 that have 100 added to the reference characters of FIG. 4 are the same as the parts described in Embodiment 1, and because Embodiment 2 is the same as Embodiment 1 except for the configuration of the fold lines, descriptions of structures, operations, and effects of those parts are omitted. The reflective sheet 125 in the backlight device according to Embodiment 2 has a cut formed by cutting the reflective sheet 125 to a half depth in the thickness direction disposed along a fold line 125a. This makes it easier to bend the reflective sheet 125 along the fold line 125a. In the manufacturing process of the backlight device 12, the reflective sheet 125 is placed in the chassis after being bent downward in a cross-sectional view along the fold line 125a. Therefore, when the reflective sheet 125 is disposed on the bottom surface of the chassis, the cut in each folded line 125a faces the front side (front side of FIG. 8).

<Embodiment 3>

Figure 9:
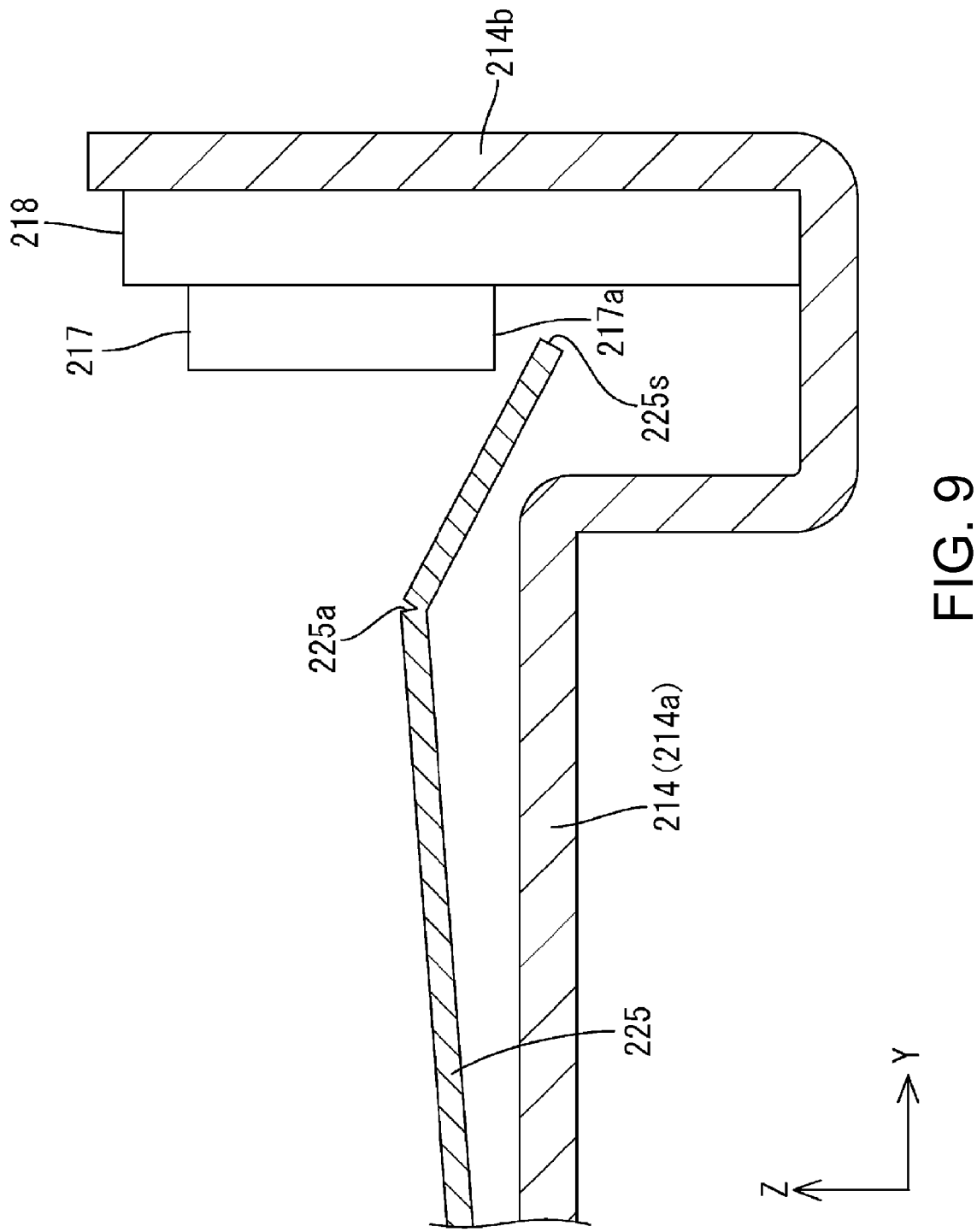
FIG. 9 shows a process (1) of a method to install a reflective sheet 225 in a chassis 214 in Embodiment 3.
Figure 10:
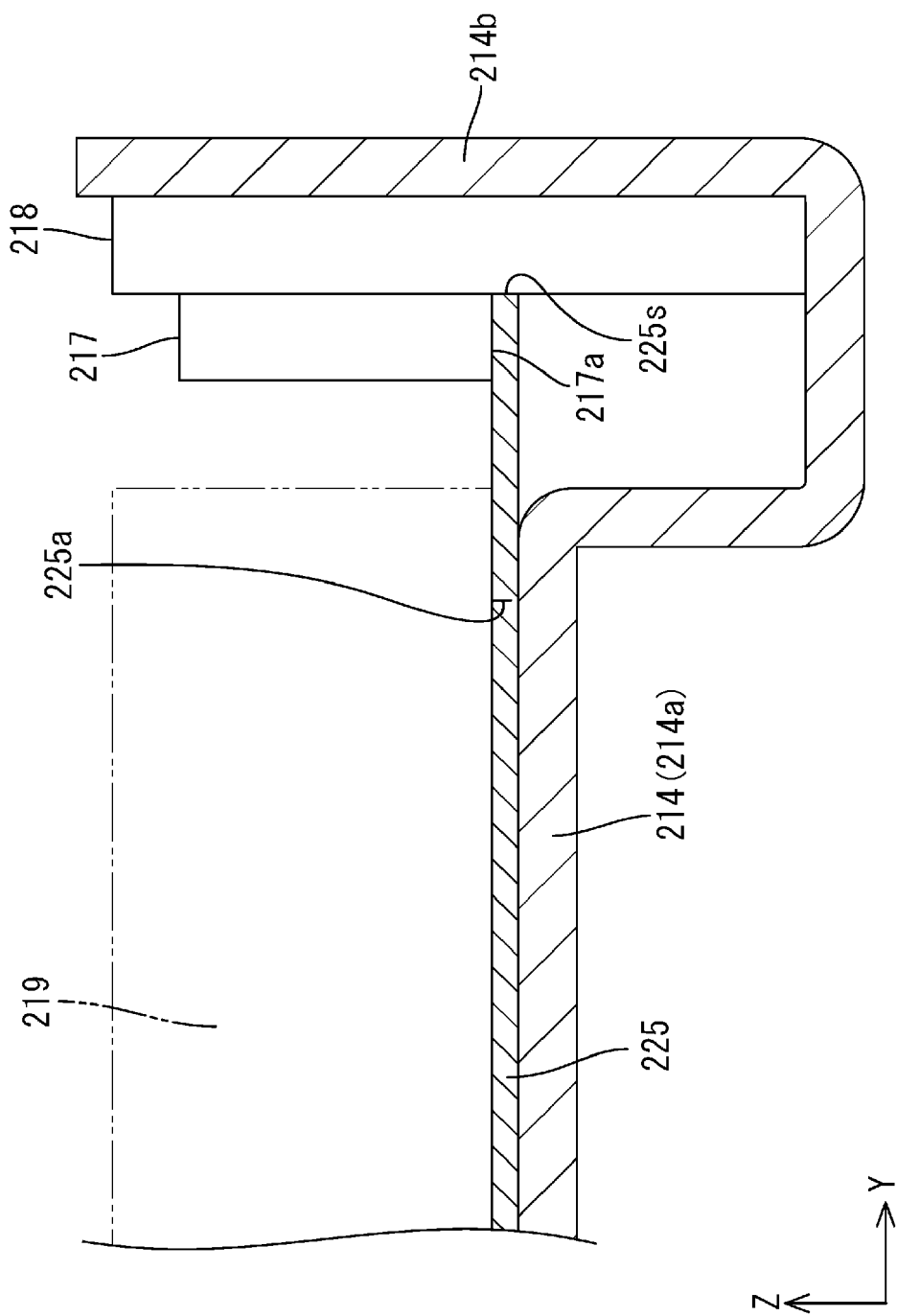
FIG. 10 shows a process (2) of the method to install the reflective sheet 225 in the chassis 214.

Embodiment 3 will be described with reference to the drawings. FIG. 9 shows a process (1) of a method to install a reflective sheet 225 into a chassis 214 in Embodiment 3. FIG. 10 shows a process (2) of the method to install the reflective sheet 225 into the chassis 214. Embodiment 3 differs from Embodiment 1 in the manner in which an LED substrate is affixed to the chassis. Other configurations are the same as those of Embodiment 1, and therefore, descriptions of the structures, the operation, and the effect are omitted. Parts in FIG. 9 that have 200 added to the reference characters of FIG. 6 and parts in FIG. 10 that have 200 added to the reference characters of FIG. 7 are the same as these parts described in Embodiment 1.

In the backlight device of Embodiment 3, an LED substrate 218 having LEDs 217 mounted thereon is affixed to a side plate 214b of the chassis 214 (see FIG. 9). Even with this configuration, when placing the reflective sheet 225 in the chassis 214 in the manufacturing process of the backlight device, first, the reflective sheet 225 is bent downward in a cross-sectional view along a fold line 225a. Next, as shown in FIG. 9, an edge 225s of the reflective sheet 225 on a side facing the LEDs 217 is placed in a recessed portion at an edge of the chassis 214, such that the edge 225s is positioned under a bottom 217a of each LED 217. Next, as shown in FIG. 10, the edge 225s of the reflective sheet 225 on the side facing the LEDs 217 is placed in the recessed portion at an edge of the chassis 214, such that the edge 225s is positioned under the bottom 217a of each LED 217. As described above, even when the LEDs 217 are affixed to the side plate 214b of the chassis 214 through the LED substrate 218, it is possible to install the reflective sheet 225 in the chassis 214 without causing the edge 225s of the reflective sheet 225 to make contact with the light-emitting surfaces of the LEDs 217.

In the backlight device of Embodiment 3, the reflective sheet 225 is disposed so as to make contact with a bottom plate 214a of the chassis 214, and the fold line 225a is disposed in a position that is covered by the light guide plate 219 and in a position of the reflective sheet 225 so as to be located on the bottom plate 214a of the chassis 214. As a result, because the fold line 225a of the reflective sheet 225 is in contact with the light guide plate 219 and the bottom plate 214a of the chassis 214, and also is sandwiched by the two, it is possible to prevent or suppress the reflective sheet 225 from being bent again along the fold line 225a after being stored in the chassis 214.

The corresponding relation between the configuration of each embodiment and the configuration of the present invention will be described. The LEDs 17, 217 are an example of the "light sources." The chassis 14, 214 is an example of the "storage member." The backlight device 12 is an example of the "illumination device".

Modification examples of each of the embodiments above will be described below.

(1) In the respective embodiments above, a configuration in which fold lines were provided along two long side edges of the reflective sheet was described as an example, but the positions of the fold lines are not limited thereto. If LEDs are disposed along the short side direction of the reflective sheet, for example, the fold lines may be provided along the short side edges of the reflective sheet.

(2) In the respective embodiments above, a configuration in which fold lines were provided along two long side edges of the reflective sheet was described as an example, but a configuration may be used in which a fold line is provided along only one long side edge of the reflective sheet. Even in this case, in the manufacturing process of the backlight device, the reflective sheet can be installed in the chassis without causing the edge of the reflective sheet on the side facing the LEDs to make contact with the light-emitting surfaces of the LEDs.

(3) In the respective embodiments above, a configuration in which the fold line was provided as a substantially straight line along the edge of the reflective sheet on the side facing the LEDs was described as an example, but the fold line does not necessarily have to be provided along the edge.

(4) In addition to the respective embodiments above, the number, position, shape, and the like of the fold line may be changed appropriately.

(5) In the respective embodiments above, a liquid crystal display device using a liquid crystal panel as a display panel was described, but the present invention is applicable to a display device that uses another type of display panel.

(6) In the respective embodiments above, a television receiver that includes a tuner was described as an example, but the present invention is also applicable to a display device without a tuner.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet
T tuner
S stand
10 liquid crystal display device
11 liquid crystal panel
12 backlight device
13 bezel
16 frame
14, 214 chassis
14a, 214a bottom plate
14b, 214b side plate
15 optical member
17, 217 LED
18, 118, 218 LED substrate
19, 219 light guide plate
19a light-emitting surface
19b light-receiving surface
19c opposite surface
25, 125, 225 reflective sheet
25a, 125a, 225a fold line

The invention claimed is:

1. An illumination device, comprising:
a light guide plate having light-receiving surfaces disposed on side faces, a light-emitting surface disposed on one of plate surfaces, and an opposite surface that is on a side opposite to the light-emitting surface;
light sources disposed to face the light-receiving surfaces of said light guide plate;
a reflective sheet having a rectangular shape in a plan view and disposed on the opposite surface of the light guide plate, the reflective sheet having edges on respective sides facing the light sources be extended toward the light sources beyond respective faces of the light guide plate opposing the light sources; and
a storage member having a bottom plate and side plates that rise from one surface of the bottom plate, the storage member storing at least the light sources, the reflective sheet, and the light guide plate therein,
wherein the light sources are affixed to the side plates of the storage member,
wherein, in the reflective sheet, adjacent to at least one edge of the edges on the respective sides facing the light sources, a fold line for bending is disposed across two edges that are connected to said one edge, and
wherein an edge portion of the bottom plate of the storage member on a side where the light sources are disposed is inclined toward a side opposite to the light-emitting surface of the light guide plate.

2. The illumination device according to claim 1, wherein the fold line is provided such that a distance between the fold line and an edge of the reflective sheet on a side facing the light sources is ⅓or less of a distance between said edge and an edge opposite thereto.

3. The illumination device according to claim 1, wherein the fold line is provided as a straight line along an edge of the reflective sheet on a side facing the light sources.

4. The illumination device according to claim 1, wherein perforations are provided along the fold line.

5. The illumination device according to claim 1, wherein a cut formed by cutting the reflective sheet to a half depth in a thickness direction thereof is provided along the fold line.

6. The illumination device according to claim 1, wherein the reflective sheet is installed in the storage member so as to be bent along the fold line toward the bottom plate of the storage member.

7. The illumination device according to claim 1, wherein an edge of the reflective sheet on a side facing the light sources is in contact with a bottom of the light sources.

8. The illumination device according to claim 1, wherein the reflective sheet is in contact with the opposite surface of the light guide plate, and
wherein the fold line is provided in a position to be covered by the light guide plate.

9. The illumination device according to claim 1, wherein the reflective sheet is in contact with the bottom plate of the storage member, and
wherein the fold line is provided in the reflective sheet so as to be located on the bottom plate of the storage member.

10. The illumination device according to claim 1, further comprising a light source substrate having a plurality of said light sources provided thereon,
wherein the light source substrate is affixed to each of the side plates of the storage member.

11. A display device, comprising a display panel that displays images using light from the illumination device according to claim 1.

12. The display device according to claim 11, wherein the display panel is a liquid crystal panel using liquid crystal.

13. The display device according to claim 11, wherein the display device is disposed such that a direction perpendicular to a thickness direction of the light guide plate is a vertical direction,
wherein the light sources are respectively provided on a top side and on a bottom side of the light guide plate, and
wherein the fold line is provided at an edge of the reflective sheet on a side facing the light sources of the top side of the light guide plate and an edge of the reflective sheet on a side facing the light sources of the bottom side of the light guide plate.

14. A television receiver, comprising the display device according to claim 11.

* * * * *